F. J. RAUSCHERT.
Fruit-Gatherer.
No. 57,766.
Patented Sept. 4, 1866.
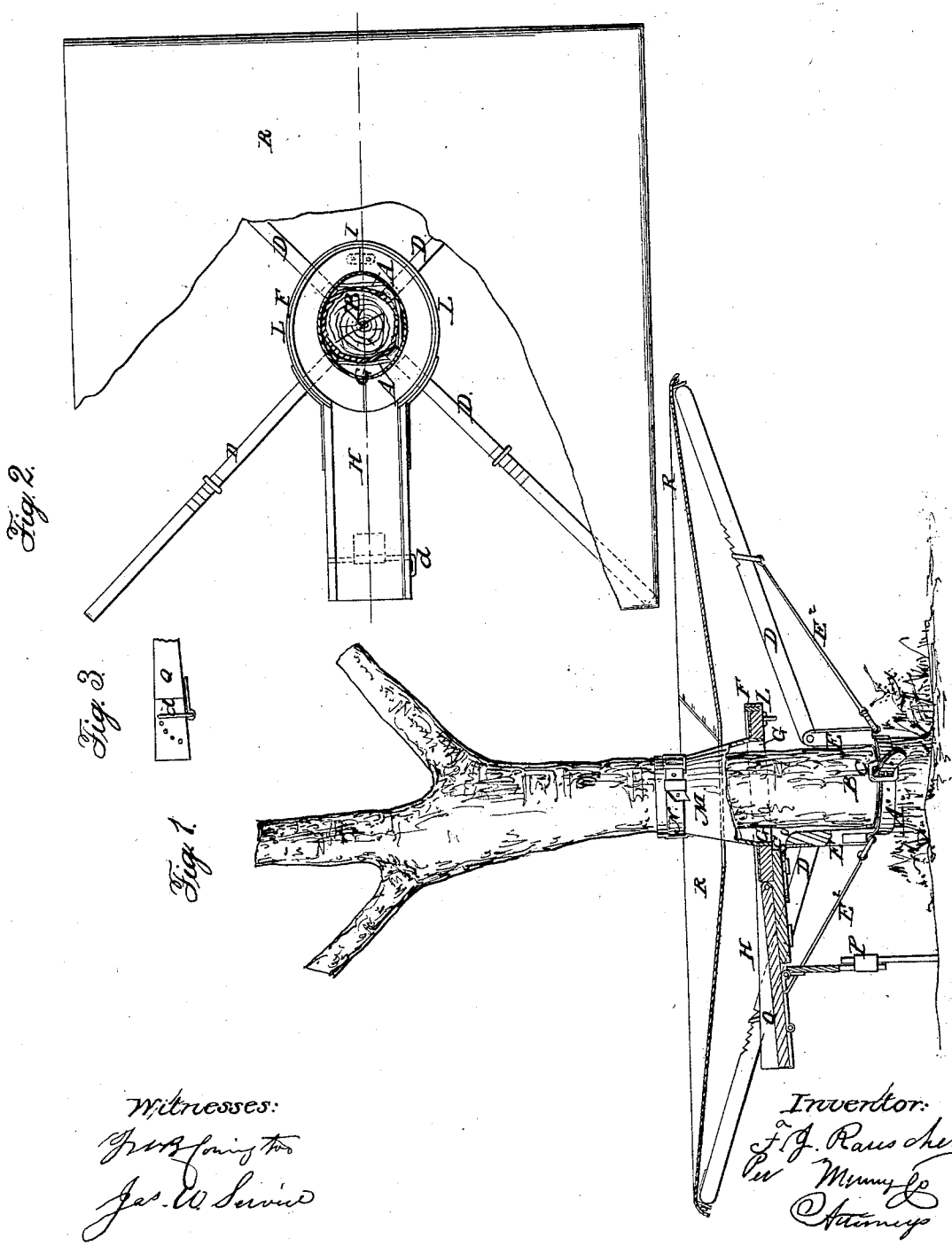

UNITED STATES PATENT OFFICE.

F. I. RAUSCHERT, OF BUFFALO, NEW YORK.

IMPROVEMENT IN FRUIT-GATHERERS.

Specification forming part of Letters Patent No. 57,766, dated September 4, 1866.

*To all whom it may concern:*

Be it known that I, F. I. RAUSCHERT, of Buffalo, Erie county, and State of New York, have invented a new and useful Improvement in Fruit-Gatherers; and I do hereby declare that the following is a full, clear, and exact description thereof, which will enable others skilled in the art to make and use the same, reference being had to the accompanying drawings, forming part of this specification.

The object of the present invention is to obviate the tedious and dangerous work of picking tree-fruit, and enable that to be gathered safe and sound which cannot be picked, and by my improved gatherer all tree-fruit can be gathered as safe and sound as it was on the tree with but little trouble and great rapidity, the importance of which is obvious, for during the fruit season, which, as is well known to all farmers, is the busiest of the year, hundreds of bushels of tree-fruit now spoil and rot, owing to the want of time to gather it, whereas, by using my harvester or gatherer it would be all saved, especially so with peaches and plums.

In the accompanying plate of drawings my improved fruit-gatherer is illustrated, Figure 1 being a central vertical section of the same in connection with the trunk of a tree, showing its connection therewith; Fig. 2, a plan or top view of the fruit-gatherer, and Fig. 3 a detail view.

Similar letters of reference indicate like parts.

A in the drawings represents a double strap, which is fastened upon the trunk B of a tree near the ground by means of a buckle, c, the inner strap being buckled tight and the outer one rather loose.

D D D D are four square slender poles, placed equidistant apart by their end portions E, hinged to them, which ends are inserted between the inner and outer straps of the double strap A; $E^2$, straps fastened to the end portions of the poles D just above the double strap A, and hung by their rings upon the poles D, with the notches of which they are interlocked; F, a trough, made of thin hard boards, of a circular form or shape at one end, with a hole, G, cut in its center to admit the tree, which trough is made in two similar parts or sections, hinged to a common spout, H, at one end, and at the other secured together by a clasp, I, the object of which is to enable the trough to be placed upon and detached from a tree at pleasure.

The upper side or surface of the trough is covered with canvas thinly underlaid with hair or other wadding.

L are sheets or strips of zinc, a little wider than the thickness of the trough, which strips are covered with canvas or cloth, and fastened around the outside of the trough, leaving a raised flange upon its upper side.

M is a piece of canvas or cloth, which at its lower edge is secured around the mouth or opening in the trough, and is capped together at its ends about the tree, and secured to it by means of a strap and buckle, N.

The spout H of the trough, by the piece O, hinged to its inner end, is secured in the double strap A in a similar manner to the poles D, hereinbefore referred to, and at or near its outer end has a supporting-leg, P, hinged to its under side, for the purpose of supporting and holding such end elevated, the height at which it is thus held being susceptible of adjustment at pleasure by lengthening or shortening the said leg P, which is suitably constructed therefor.

The bottom of the spout H is hinged at its inner end, so as to be susceptible of being inclined more or less, it being secured in position by means of a stop-pin, d, arranged in the outer end of one of the side pieces, Q, of the spout.

R is a canopy or canvas, made of a suitable shape and size to embrace the extent of the poles D, to the ends of which it is secured at each corner by means of rings attached to its corners and engaged with the fixed pins of the said poles D, which canvas, by means of the strap-connections $E^2$ between the poles and their hinged portions inserted in the double strap A, can be adjusted so as to incline more or less in any direction about the tree, whether to the one or to the other side, according as may be found most desirable or expedient in the gathering of the fruit from such tree, the spout being arranged upon the side of the tree where the canvas is lowest, for reasons which are obvious without any particular mention herein, and there properly adjusted with regard to the inclination or declivity of the same.

From the above description of my improved fruit-gatherer it will be readily apparent that fruit which cannot be picked can be gathered by it in the quickest and easiest manner possible, and without the least injury to it, or danger to a person's life or limbs; and that, furthermore, my gatherer can be applied to any tree with facility, ease, and dispatch, it being extremely simple in its construction, and susceptible of being completely packed for transportation or removal.

Having thus described my invention, I claim as new and desire to secure by Letters Patent—

The combination of the strap A, poles D, trough F, having spout H, and canopy R, when all constructed and arranged together substantially as and for the purpose described.

Witnesses:       F. I. RAUSCHERT.
C. F. BUNTEKIEL,
M. W. CHAPIN.